United States Patent [19]

Izumi et al.

[11] E Patent Number: Re. 32,792

[45] Reissued Date of Patent: Nov. 29, 1988

[54] PROCESS FOR PRODUCING MESOPHASE PITCH

[75] Inventors: Takayuki Izumi; Tsutomu Naito, both of Saitama; Seiko Igarashi, Sakado, all of Japan

[73] Assignee: Toa Nenryo Kogyo Kabushiki Kaisha, Tokyo, Japan

[21] Appl. No.: 926,153

[22] Filed: Nov. 3, 1986

Related U.S. Patent Documents

Reissue of:

[64] Patent No.: 4,533,461
Issued: Aug. 6, 1985
Appl. No.: 281,407
Filed: Jul. 8, 1981

[30] Foreign Application Priority Data

Jul. 21, 1980 [JP] Japan ..... 55-99646

[51] Int. Cl.[4] ..... C10C 3/00
[52] U.S. Cl. ..... 208/44; 208/40
[58] Field of Search ..... 208/40, 44

[56] References Cited

U.S. PATENT DOCUMENTS

| | | | |
|---|---|---|---|
| 2,896,261 | 7/1959 | McAfee | 208/39 |
| 3,976,729 | 8/1976 | Lewis et al. | 423/447.8 |
| 4,026,788 | 5/1977 | McHenry | 208/40 |
| 4,033,430 | 6/1977 | Lewis | 208/40 |
| 4,184,942 | 1/1980 | Angier et al. | 208/44 |
| 4,488,957 | 12/1984 | Noguchi et al. | 208/40 |
| 4,529,498 | 7/1985 | Watanabe | 208/40 |

FOREIGN PATENT DOCUMENTS

| | | | |
|---|---|---|---|
| 2067538 | 7/1981 | United Kingdom | 423/445 |

*Primary Examiner*—Helen M. S. Sneed
*Assistant Examiner*—Helane Myers
*Attorney, Agent, or Firm*—Seidel, Gonda, Goldhammer & Abbott

[57] ABSTRACT

A substantially uniform mesophase pitch is prepared by treating a mesophase forming pitch material at elevated temperatures above about 380° C. to produce a mixture of mesophase and non-mesophase pitch containing about 20% to about 80% mesophase. The mixture is then maintained at a temperature below about 400° C. for a time sufficient to allow the mesophase to coalesce and settle as a lower separable layer. A mesophase pitch so produced may contain from 90 to 100% mesophase with a softening point of less than 320° C.

9 Claims, 3 Drawing Sheets

PROCESS FOR PRODUCING MESOPHASE PITCH

Matter enclosed in heavy brackets [ ] appears in the original patent but forms no part of this reissue specification; matter printed in italics indicates the additions made by reissue.

BACKGROUND OF THE INVENTION

In conformity with the development of techniques in aircraft industry, motorcar industry and various other industries, and particularly in conformity with necessity of saving energy and resources cried for recently, there have early been sought (1) carbon fibers having high strength and modulus of elasticity which are usable for the production of light weight composite materials and (2) moldable carbon materials having high strength and modulus of elasticity which are usable for various purposes after compression molding. The present invention relates to a process for producing such a material suitable for the production of carbon fibers and moldable carbon materials, i.e., a homogeneous mesophase pitch having a low softening point that is moldable by, for example, melt spinning at relatively low temperatures.

The meaning of the term "mesophase" is not necessarily standardized in the academic world or various technological literatures. The term "mesophase" herein indicates an optically anisotropic portion which is one of the constituents of pitch. If the section of a pitch mass solidified at a temperature around room temperature is polished and observed by means of a reflected polarized light microscope under crossed polarizer and analyzer, a sheen is observed under stage rotation which is an optically anisotropic portion of the pitch. An optically isotropic portion of the pitch is that in which no sheen is observed with the operation mentioned above, and the isotropic portion will be called "non-mesophase" hereinafter.

Generally, when heavy hydrocarbons such as tar and pitch, which originally are in completely non-mesophase states are heat-treated to affect thermal cracking and polycondensation reactions, spherules of mesophase begin to appear in the pitch, which spheres grow gradually by coalescence. As compared with the non-mesophase portion, the mesophase comprises mainly molecules of a chemical structure in which polycyclic aromatic condensed rings have much more developed planar structure and orientation and in which the molecules are cohesively associated together to form a laminate of the planes. When molten, the mesophase has optical properties associated with crystals and hence mesophase is considered a liquid crystal state. If mesophase pitch is spun by extrusion through a thin nozzle, the planes of the molecules are arranged nearly along the axis of the fiber. Therefore, the carbon fibers made of the mesophase pitch have a high modulus of elasticity.

The amount of mesophase in a pitch is determined by polarized light microscopic examination of polished samples by relating the area of the optically anisotropic portion to the total area examined. The result is expressed as volume %. A pitch comprising mainly mesophase, and less than 10% non-mesophase, is called "mesophase pitch" herein.

As for the homogenicty of pitch, a pitch having a mesophase content in the range of about 90% to 100%, determined as above, and containing infusible particles (particle diameter of at least 1μ) which are practically undetectable in the micrographic observation, is herein called "substantially homogeneous mesophase pitch", since it exhibits an excellent homogeneity in the actual melt spinning process.

The term "softening point" of the pitch herein indicates a temperature at which the pitch is converted from the solid to the liquid phase. This temperature is the temperature at the peak of the absorption and release of latent heat when the pitch is fused or solidified and is determined with a differential scanning calorimeter. This temperature coincides with that determined by another method (such as ring-and-ball method or micromelting point method) with an error within plus or minus 10° C. The term "low softening point" herein indicates a softening point in the range of about 230° C. to 320° C.

Several processes have been proposed for the production of mesophase pitch required for the production of high-performance carbon fibers. However, those processes have many problems such as those shown below:

(1) The starting materials are commercially not easily available.

(2) A reaction for a long period of time is required or complicated steps are required.

(3) Production costs are high.

(4) As mesophase is increased to close to 100%, the softening point is elevated to make the spinning difficult.

(5) If the softening point is controlled, the pitch becomes heterogeneous and the spinning thereof becomes difficult.

More particularly, a process disclosed in the specification of Japanese Patent Publication No. 8634/1974 necessitates (a) a starting material which is unavailable in a large amount at a low cost such as chrysene, anthracene or tetrabenzophenazine, (b) complicated production steps including dry distillation of a tar obtained by cracking a crude oil at a high temperature followed by the filtration of the infusible substance at 410° C. and (c) a spinning temperature of as high as 400°–420° C. In a process disclosed in the specification of Japanese Patent Application Laid Open No. 118028/1975, a starting material is converted into a heavier fraction by heat treatment with stirring. According to examples given therein, a high softening point pitch is obtained by a simple step and a reaction for a long period of time and the removal of infusible matter is required for obtaining a low softening point pitch. A process disclosed in the specification of Japanese Patent Publication No. 7533/1978 comprises the polycondensation carried out in the presence of a Lewis acid catalyst such as aluminum chloride. However, this process is complicated and requires a great operational cost, since it also includes steps of removal of the catalyst and heat treatment before and after the catalyst removal. In a process disclosed in the specification of Japanese Patent Application Laid-Open No. 89635/1975, the polycondensation reaction of the non-mesophase pitch is carried out under heating until a mesophase content of 40% to 90% has been attained, while an inert gas is introduced in the liquid phase or under reduced pressure. A process disclosed in the specification of Japanese Patent Laid-Open No. 49125/1978 comprises carrying out the thermal polycondensation reaction under stirring until a mesophase content of 50% to 65% has been attained. In both of the pitches from above processes, mesophase is substantially equal to quinoline insoluble matter, and the softening point is controlled to the limit while a considerale non-mesophase is left. A disadvantage of the foregoing processes is that the spinning properties of the resultant pitch are poor, since the pitches are substantially heterogeneous. A process disclosed in the specification of Japanese Patent Publication No. 55625/1979 comprises the combination of the processes of said Japanese Patent Laid-Open No. 89635/1975 and said Patent Laid-Open No. 49125/1978; namely, this process comprises carrying out the polycondensation reaction by thermal cracking for a long period of time by the actions of bubbling of the inert gas stirring until 100% conversion into mesophase has been attained. This process has a problem in that the polycondensation reaction proceeds excessively to elevate both softening point and spinning temperature, though a homogeneous mesophase pitch can be obtained. A process disclosed in the specification of Japanese Patent Publication No. 160427/1979 includes a complicated, expensive process of extraction treatment with a solvent, and it has a problem that generally a mesophase pitch of a high softening point (above about 330° C.) is formed, through the mesophase pitch is substantially homogeneous.

As will be understood from the above descriptions, it is difficult to produce a homogeneous mesophase pitch having a sufficiently low softening point and capable of being spun stably on a commercial scale by the conventional processes excluding catalytic processes. More particularly, according to the conventional processes, the thermal cracking/polycondensation reaction of the heavy hydrocarbons is carried out substantially in a simple step at a temperature of about 400° C. over a long period of time. Therefore, as the mesophase content is increased gradually, the softening point of the pitch as a whole is elevated and, accordingly, temperature suitable for the melt spinning thereof (spinning temperature) is also elevated. If the reaction is terminated when a suitable spinning temperature has been attained, a heterogeneous pitch comprising an apparent mixture of the mesophase and the non-mesophase is formed, whereby the smooth spinning becomes impossible in many cases. This problem can be solved by continuing the reaction at a lower temperature to obtain a homogeneous pitch having a mesophase pitch content of essentially 100%. However, in this process, a long period of time is required for the reaction under strictly controlled temperature, and it is difficult to obtain a pitch of a high quality with a high reproducibility. Further, generally the softening point is extremely high in such a case and the stable spinning on a commercial basis is difficult. As a result, it is not easy to produce carbon fibers of a high performance.

After intensive experiments, the inventors have hit on the idea that the above problems in the prior art are due to the fact that the mesophase-constituting molecules are further subjected to the polycondensation reaction in the mesophase to make the molecular weight thereof excessively large, since the mesophase formed in the initial stage in the thermal cracking/polycondensation reactor is also kept at a high temperature until the completion of the reaction. The inventors have found that those defects of the conventional processes can be overcome by separating out the mesophase in the course of the thermal cracking/polycondensation reaction and that a pitch comprising nearly 100% mesophase and having a sufficiently low softening point can be obtained by this process. As means of separating the mesophase in the course of the thermal reaction, the following processes were tested:

(1) A process wherein the mesophase is concentrated by the extraction with a solvent such as n-heptane, benzene or toluene before it is separated out, and (2) A process wherein the mesophase is separated out directly without using any solvent.

As a result, it has been found that the latter is superior to the former, since in the former, it is difficult to control the softening point of the mesophase and the steps are complicated. The present invention has been attained employing the latter process. Indeed the inventors have made intensive investigation of the latter process. For example, if a heavy hydrocarbon is subjected to thermal cracking/polycondensation reaction in an ordinary manner and the thermal reaction is suspended when the mesophase is formed partially, such as in the form of small spheres dispersed therein, and then the reaction product is allowed to stand and settle at a lower temperature, for example, in a temperature range at which the thermal cracking/polycondensation hardly occurs and the pitch is maintained sufficiently fluid, the small mesophase spheres precipitate and grow and form a coalescence in the reactor. These spheres are further coalesced at the bottom of the reactor and the reaction product is, therefore, divided clearly into an upper layer and a lower layer similar to that observed when water and oil settle in a vessel. The upper layer was taken out and examined to reveal that it was a non-mesophase pitch portion containing a small amount of fine spherical mesophase particles. The lower layer was nearly 100% mesophase pitch portion of a low softening point which could not have easily been obtained in the prior art. The lower layer pitch had excellent spinning properties and was molded and converted into carbon fibers by a conventional method which proved to be so-called high performance carbon fibers.

Therefore, the principal object of the present invention is to provide a process for producing a mesophase pitch wherein the whole steps can be completed in a short time of, for example, about 1-3 hours without necessitating complicated steps of high temperature filtration of infusible matter, extraction with a solvent and addition and removal of a catalyst.

Another object of the present invention is to provide a process for producing a mesophase pitch having a mesophase content of about 90%-100% and a low softening point (for example, 260° C.) and, therefore, a low optimum spinning temperature (for example, 340° C.).

Still another object of the present invention is to provide a process for producing a homogeneous mesophase pitch free of quality degradation which can be spun at a temperature far lower than a temperature at which remarkable thermal cracking/polycondensation reaction occurs (about 400° C.) to form a carbon fiber product of a stable quality having excellent spinning properties (such as breakage frequency, fineness of the filament and filament diameter distribution).

Still another object of the present invention is to provide a process for producing mesophase pitch which does not substantially form any decomposition gases or infusible matter during the spinning, thereby producing pitch fibers scarcely containing bubbles or solid contaminants, and hence providing carbon fibers of a high strength.

A further object of the present invention is to provide a pitch comprising nearly 100% of the mesophase having an excellent molecular orientation capable of forming a carbon fiber product having a high modulus of elasticity in which crystal orientation in the graphite structure in a direction of the filament axis is well developed.

Another object of the present invention is to provide a process for producing a mesophase pitch wherein properties and quality of the pitch can be controlled stably and easily by providing steps of accumulation again, and separation of the liquid crystalline pitch after the thermal cracking/polycondensation reaction step, even if properties of the starting material vary considerably, or even if the operation conditions in the preceding step are varied to some extent.

The process of the present invention for producing mesophase pitch is described below.

SUMMARY OF THE INVENTION

In summary, the present invention provides a process for producing a mesophase pitch comprising subjecting a starting material such as heavy oil, tar or pitch containing heavy hydrocarbon of boiling point above 400° C. as principal component to a thermal cracking-/polycondensation reaction at the temperature of at least about 380° C., and preferably from about 380° to about 460° C. to attain a mesophase pitch portion content of the residual pitch of about 20% to 80%, then allowing the resulting polycondensation to settle at a temperature of below 400° C., and preferably about 350°-400° C. (the term "allow to settle" herein indicates that the reaction mixture is not agitated at all nor is it subjected to gas sparging or any other agitation that disturbs precipitation and separation of mesophase) to accumulate a mesophase pitch portion of a higher density as a continuous phase in a low layer while this layer is allowed to grow and to age, which means that lower layer becomes larger and richer in mesophase portion by coalescence and rearrangement of mesophase, and separating out the lower layer from an upper layer comprising mainly non-mesophase pitch of a lower density. The pitch thus produced by the process of the present invention is a substantially homogeneous mesophase pitch containing about 90%-100% of the mesophase portion and having an extremely low softening point (about 230°-320° C.) and, therefore, a sufficiently low optimum spinning temperature (about 280°-380° C.).

BRIEF DESCRIPTION OF DRAWINGS

FIG. 1 shows a pitch from the thermal cracking-/polycondensation step of this invention which contains a suitable amount of spherical mesophase dispersed therein.

FIG. 2 shows the bottom of the same pitch as in FIG. 1 after allowing it to stand at 380° C. for 10 minutes.

FIG. 3 shows a boundary between the two layers obtained after allowing the pitch in FIG. 1 to stand at 380° C. for 30 minutes.

FIG. 4 shows a boundary between the two layers obtained after allowing the pitch in FIG. 1 to stand at 380° C. for two hours.

FIG. 5 shows the lower layer pitch taken out in Example 2.

DETAILED DESCRIPTION OF INVENTION

Figure 1:
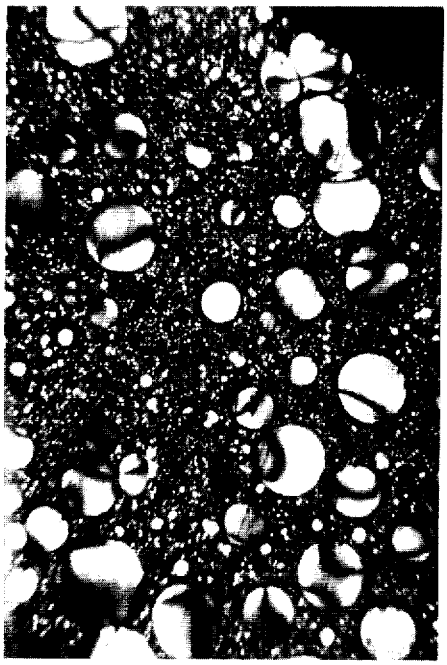
FIGS. 1 through 5 are microphotographs at magnifications of 50X of polished pitch sections which were taken by means of a polarized light microscope of reflection type under crossed polarizers.

One of the characteristic features of the present invention is that various carbonaceous substances such as heavy hydrocarbon oil, tar and pitch can be used as the starting material as described above. More particularly, there may be used various petroleum heavy oils, tar obtained by the thermal cracking, and tar obtained by the catalytic cracking as well as heavy oil, tar and pitch obtained by the dry distillation of coal and, in addition, heavy liquefied coal obtained in the liquefaction of coal. However, as a matter of course, the carbonaceous hydrocarbons containing solid particles, such as carbon particles, are not preferred starting materials without previously removing such carbon particles through a suitable filter. Also, materials containing an excess of light oil fraction are not preferred starting materials. With such materials, it is desirable to first distill the substance under reduced pressure to control the composition thereof so that it contains components of a boiling point of at least about 400° C. as main ingredients. Some of the heavy oils, tars and pitches contain components of excessively high molecular weights or they form the high molecular weight components easily in the thermal polycondensation step. These, too, are not preferred, since they increase the viscosity of the reaction system and inhibit the coalescence and settling of the mesophase in the subsequent reaction step. Also, they tend to elevate the softening point of the resulting mesophase. Such substances include, for example, asphalts and tars obtained by the steam cracking of asphalt and petroleum. They per se are unsuitable for the starting material of the present invention. They can, of course, be used as the starting material of the present invention after removing the harmful components by any method. For example, they may be used in the present invention after treatment by (1) the removal of insoluble matter with a suitable solvent after slight, previous polymerization reaction, or (2) hydrocracking reaction or (3) heat-soaking followed by highly reduced pressure distillation for the removal of the bottom residue.

In the present invention, the starting material is first introduced in a thermal g reactor, either directly or after a necessary pretreatment with due regard to the above conditions, to effect the thermal reaction at a temperature of at least 380° C., and preferably in the range of about 380°-460° C., more particularly about 400°-440° C. for a time sufficient for the formation of the mesophase. The thermal g reaction can be carried out also by any of well-known conventional processes for partially producing a mesophase from a heavy hydrocarbon material. However, in the conventional process, a residence time of several to ten hours is required at a temperature as low as approximately 380° C. On the other hand, according to the process of the present invention, the reaction can be carried out in a short period of time of, for example, only one hour at a high temperature of 440° C. This is one of the characteristic features of the present invention. In this connection, however, it is unsuitable to carry out the thermal cracking/polycondensation reaction at a temperature of above 460° C., since the evaporation of the unreacted starting material is accelerated, the softening point of the mesophase is elevated and the control of the reaction becomes difficult.

In the thermal cracking/polycondensation reaction step, the reaction system is stirred so as to prevent the local overheating. The thermal cracking/polycondensation reaction can be carried out under reduced pressure so as to remove the low molecular weight substances formed by the thermal cracking or preferably while an inert gas is introduced in the reactor, though it is not necessary and merely optional to bubble the gas through the pitch. Alternatively, the thermal cracking-/polycondensation reaction can be carried out under atmospheric or elevated pressure without the inert gas introduction and then, the low molecular weight substances can be removed by reduced pressure distillation or by stripping treatment with an inert gas.

In the thermal cracking/polycondensation reaction step, the thermal cracking and the polycondensation of heavy hydrocarbons in the starting material occur as the main reactions to change the chemical structures of the pitch component molecules. Roughly, the reactions include the breakage of the paraffin chain structure, dehydrogenation, ring closure and polycondensation for the development of the planar structures of the polycyclic condensed aromatic compounds. It is considered that molecules having well-developed planar structures are associated together and coalesced to form a phase called mesophase.

Another important feature of the present invention is that the thermal cracking/polycondensation reaction is suspended when a mesophase content in the resulting pitch, from which the low molecular weight products and unreacted reactants have substantially been removed, of about 20–80%, preferably about 40–70%, and more preferably about 40–60% has been attained, and then the pitch is transferred into the aging/settling and separation steps where the mesophase is allowed to grow, precipitate, accumulate, age, and separate. In order to obtain a homogeneous mesophase pitch of a low softening point with a high yield in the aging/settling step, the transfer into the step is suitably effected when the above-described yield of pitch has been attained, i.e., when a mesophase content of about 20–80% has been attained and the softening point thereof is below 250° C. If the mesophase pitch content of the pitch, after completion of the thermal cracking polycondensation reaction, is less than 20%, yield of the homogeneous mesophase pitch in the subsequent aging/settling step is extremely poor and of no practical value. If softening point of the pitch after completion of the thermal cracking/polycondensation reaction is above 250° C., or if the mesophase content of the pitch is more than 80%, the phase separation in the subsequent step is unsatisfactory and the resulting mesophase pitch has an excessively high softening point. Namely, if the mesophase formation in the thermal cracking-/polycondensation step is insufficient, yield of the lower layer mesophase pitch obtained by one separation operation in the subsequent step is poor, and economically disadvantageous. On the other hand, if the mesophase formation is excessive, the boundary between the upper and the lower layers becomes unclear and, the mesophase includes large amounts of non-mesophase material or the resulting mesophase pitch has a high softening point which does not meet the object of the present invention, even though yield of the mesophase pitch is increased in the aging/settling step.

The pitch, having the prescribed mesophase content, is transferred to the subsequent step, i.e., mesophase aging/settling/separation step by transferring the pitch into a reaction tank especially provided for carrying out the aging/settling/separation step. Alternatively, in case the pitch is produced by a complete batch method, the aging/settling/separation step may be carried out in one and the same reaction tank, i.e., the tank in which the thermal cracking/polycondensation reaction has been carried out. In the latter case, the transportation operation of the pitch can be omitted.

The above aging/settling/separation step is an important characteristic feature of the present invention. The temperature employed in this step is preferably in a range slightly below the temperature range of the preceding thermal cracking/polycondensation step. More particularly, said step must be carried out at a sufficiently low temperature at which the thermally cracked gas generation is small, no more polycondensation reaction proceeds and molecular weight increase of the already formed mesophase molecules hardly occurs, but a sufficiently high temperature at which such a viscosity can be kept as that the whole system is liquid and the growing, coalescence and sedimentation of mesophase occur rapidly. Such a temperature range varies depending on the starting material and thermal cracking-/polycondensation conditions in the preceding step. Generally, a latitude of several ten degrees centigrade is allowed in this step and, accordingly, the temperature can be controlled within a broad range. The temperature range in this step is from about 350° to 400° C., generally preferably in the range of about 360°–390° C. The temperature is generally maintained within such a range by slightly warming or cooling the pitch which has been heated to the high temperature in the preceding step, and particular control with a large heat is unnecessary.

In the aging/settling reaction step, the clear separation of the mesophase and non-mesophase portions cannot be recognized readily at a temperature of below 350° C. On the other hand, a temperature above 400° C. generally unsuitable, since at such a high temperature, the mesophase pitch is denatured in the course of the settling and the softening point is elevated.

In the aging/settling step, the object can be attained substantially by allowing the mixture to stand without stirring of the liquid phase of the pitch. However, it is preferred to stir the mixture so as to obtain homogeneous temperature distribution and composition distribution over the system in the initial stage of the step. Further, slow stirring or slow circulation of the mixture can be applied continuously in the course of the reaction.

The time required in the above step may be selected freely over the range of from 5 minutes to 4 hours in the suitable temperature range, like about 360°–390° C. If the time is very long, the softening point tends to be high, though 100% mesophase can be separated out. On the other hand, if the time is too short, a product having a high non-mesophase content is separated out, though the softening point is low.

Figure 4:
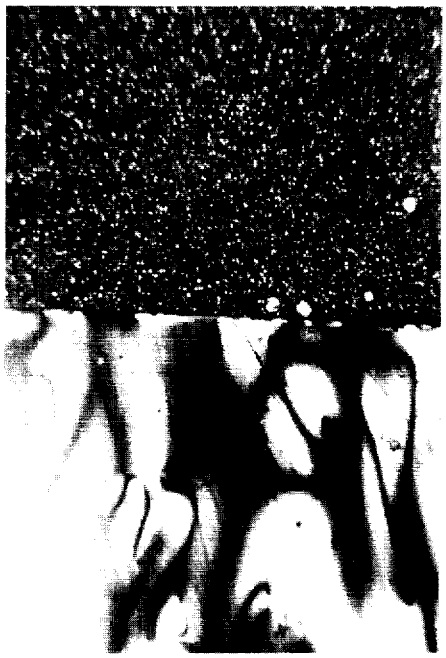
Figure 5:
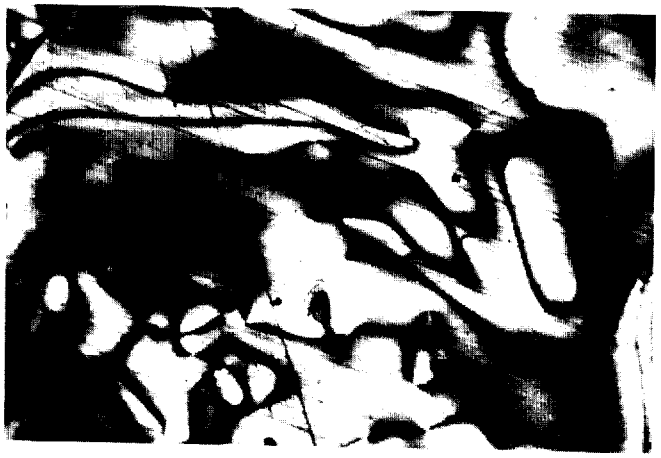

The aging/settling/separation step of the present invention will be better understood by reference to drawings. In the aging/settling/separation step, the mesophase formed in the preceding thermal treatment step is generally dispersed in the pitch as spheres having a diameter of up to 200μ (see FIG. 1). Those spheres grow and are coalesced gradually in this step and accumulate at the bottom of the mixture. These coalesced spheres are further coalesced to form large masses at the bottom (see FIG. 2). Then, the masses are coalesced to form a large liquid layer (see FIG. 3), which finally is divided from the upper non-mesophase pitch (containing a small amount of the very small mesophase spheres) by a clear, plane boundary (FIG. 4). When such a state has been attained, a valve placed at a lower part of the aging/settling tank is opened to allow the lower layer to flow out gently therefrom, thereby recovering the intended pitch product (see FIG. 5). Alternatively, it is possible to draw out the upper layer of non-mesophase portion. In either case, when one of the layers has flowed out and the boundary portion between the two layers begins to flow out, this fact can easily be detected from the pressure difference and flow rate in the drawing pipe.

Figure 2:
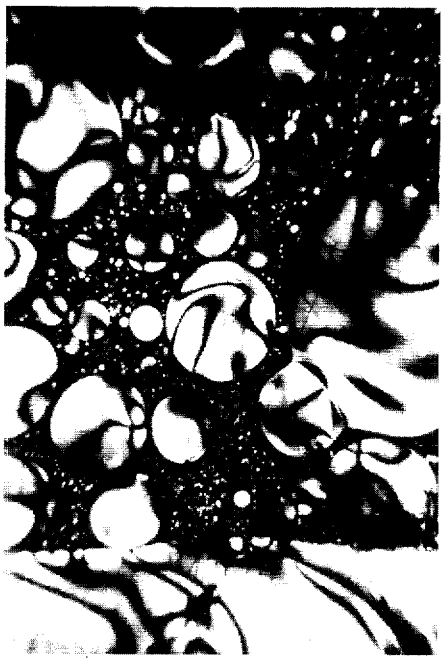
Figure 3:
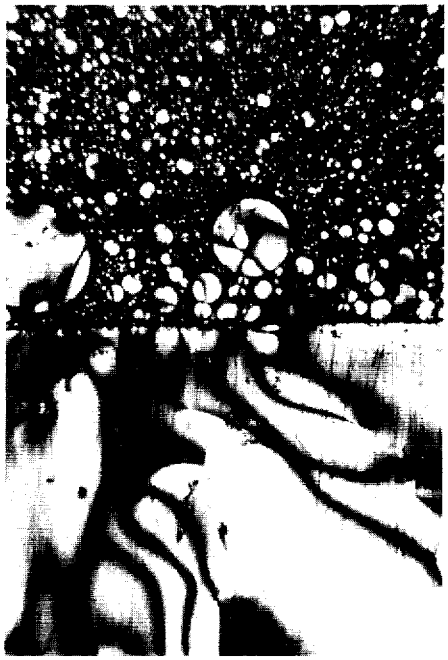

If a pitch of not completely 100% mesophase, but substantially homogeneous mesophase pitch, containing at least 90% mesophase is to be obtained in the aging-/settling/separation step, the mesophase pitch may be drawn out when the spheres of the mesophase have settled sufficiently, but have not completely coalesced in a clearly divided lower layer (see FIGS. 2 and 3)

The upper layer mainly comprising the non-mesophase portion from the aging/settling/separation step can be returned and used again in the aging/settling-/separation step or in the preceding thermal cracking-/polycondensation step. More particularly, it has been found that if the upper layer, mainly comprising the non-mesophase and still containing a very small amount of the fine spheres (diameter: 10–20μ), is subjected again to the aging/settling/separation step after the separation of the lower layer, the spheres of the mesophase grow, settle and coalesce to form the mesophase settling in a lower layer, though yield thereof is a little lower than that obtained in the first aging/settling/separation. It has been recognized further that the mesophase pitch obtained in the second batch has a softening point lower than that in the first aging/settling/separation step. Apparently, not only the simple settling/separation of the mesophase formed in the preceding thermal cracking/polycondensation step occurs, but also the pitch-constituting molecules convertible into the mesophase which are present in the non-mesophase portion are incorporated into the mesophase spheres present in that upper layer which gradually grow into larger coalesced mesophase.

If the upper layer mainly comprising the non-mesophase is returned into the preceding thermal cracking-/poly condensation step, the mesophase content thereof is increased in a short period of time and the mesophase spheres grow into greater diameters. Then, they are transferred into the aging/settling/separation step to separate out the lower layer, thereby obtaining the substantially homogeneous mesophase pitch of low softening point with a high yield.

Therefore, the present invention includes a process wherein the upper layer, mainly comprising the non-mesophase mesophase pitch from the aging/settling-/separation step, is recycled to obtain the substantially homogeneous mesophase pitch of a low softening point with a high yield.

The pitch produced by the process of the present invention has a mesophase content of about 90–100% and is a substantially homogenous mesophase pitch. In addition, it has an extremely low softening point (about 230°–320° C.) which could not be attained easily in the prior art. The pitch has, therefore, a sufficiently low melt spinning temperature (about 280°–380° C.); and, it has been found that carbon fibers of extremely good performance can be obtained stably from the pitch of this invention. As shown in Table 1, the substantially homogeneous mesophase pitch having a mesophase content of about 90–100%, and having a low softening point obtained by the process of the present invention, can be meltspun by a conventional process at a temperature enough below about 380° C. to form fibers having a diameter of 5–12 mμ in average. Breaking frequency of the fibers is small while they can be rolled down at a high speed.

TABLE 1

SPINNING PROPERTIES OF MESOPHASE PITCH AND PROPERTIES OF CARBON FIBERS

| | Properties of pitch before Spinning | | Spinning Conditions | | | Properties of Pitch after Spinning | | | Properties of Carbon Fiber (Carborization at 1.500° C. Average of 16 Samples) | | |
|---|---|---|---|---|---|---|---|---|---|---|---|
| Pitch Samples | Softening Pt (°C.) | Quinoline Insoluble Matter (wt %) | Temp (°C.) | Velocity (m/min) | Spinning Time (min) | Breakage Frequency Times/ 10 mins | Softening Pt (°C.) | Quinoline Insoluble Matter (wt %) | Thick-ness (μ) | Tensile Strength (GPa) | Modules of Elasticity ($10^2$ GPa) |
| EX 1 | 256 | 41 | 340 | 550 | 10 | Less than 1 | — | — | 9.1 | 3.0 | 2.4 |
| (Present | | | | | 60 | " | — | — | 6.2 | 3.7 | 2.2 |
| Invention) | | | | | 180 | " | 257 | 42 | 9.9 | 2.8 | 2.2 |
| EX 2 | 257 | 42 | 345 | 500 | 10 | " | — | — | 6.3 | 3.8 | 3.5 |
| (Present | | | | | 60 | " | — | — | 8.8 | 3.1 | 2.4 |
| Invention) | | | | | 120 | " | 262 | 45 | 10.5 | 3.2 | 2.4 |
| EX 3 | 265 | 48 | 160 | 500 | 10 | " | — | — | 11.5 | 2.0 | 2.0 |
| (Present | | | | | 60 | " | — | — | 9.0 | 2.6 | 2.6 |
| Invention) | | | | | 120 | " | 268 | 50 | 10.0 | 2.3 | 2.2 |
| EX 4 | 325 | 62 | 390 | 300 | 10 | " | — | — | 13.2 | 1.7 | 1.8 |
| (Comp. | | | | | 60 | More than 20 | 142 | 68 | 15.9 | 1.2 | 2.0 |
| Ex) | | | | | | | | | | | |

The pitch fibers thus obtained from the substantially homogeneous mesophase of the low softening point formed by the present invention are completely made infusible by heating to a temperature above 200° C. for a time ranging from about 10 minutes to about one hour under oxygen atmosphere. The pitch fibers thus made infusible are carbonized by heating the same to 1,300° C. in an inert gas. Thus resulting carbon fibers have a tensile strength of $2.0–3.8\times10^9$ Pa and tensile modulus of elasticity of $1.6–3.0\times10^{11}$ Pa, though the properties vary depending on diameters thereof. When the carbon fibers were carbonized up to 1,500° C., the tensile strength and tensile modulus of elasticity thereof were $2.4–4.0\times10^9$ Pa and $2.0–4.0\times10^{11}$ Pa, respectively.

The present invention will be illustrated by way of examples.

EXAMPLE 1

A tar obtained by reduced pressure distillation of a tarry substance by-product in the catalytic cracking of petroleum to a temperature of 450° C. (which is a temperature calculated as under atmospheric pressure) was used as starting material.

The starting material was a viscous liquid at ambient temperature having characteristic values of a carbon content of 89.6 wt.%, hydrogen content of 8.9 wt.%, specific gravity of 1.06 and quinoline-insoluble matter content of 0%. 1,000 g of the starting tar was charged in a 1.45 liter reactor and heat-treated at 430° C. under thorough stirring under nitrogen gas stream under atmospheric pressure for 2 hours. Thus, 19.6 wt.%, based on the starting tar, of a pitch was obtained which had a softening point of 217° C., specific gravity of 1.32 and quinoline-insoluble matter content of 15 wt.% and which comprised about 50% content of mesophase spheres of a diameter of up to 200μ which were almost perfectly spherical in the isotropical mother phase (observed by means of a polarized light microscope).

The pitch was charged in a small aluminum vessel having an inner diameter of 3 cm and a length of 10 cm and allowed to stand therein at 380° C. under nitrogen atmosphere for one hour without stirring. Then, it was cooled and thereby solidified. The pitch was polished in perpendicular direction as it was kept in the vessel. The cross section thereof was observed by means of a polarized light microscope to reveal that the pitch was divided in two (upper and lower) layers. The pitch in the upper layer comprised principally non-mesophase containing perfectly spherical, mesophase spheres of a diameter of less than 20μ in an amount of about 25%. The pitch in the upper layer had a softening point of 192° C., specific gravity of 1.30 and quinoline-insoluble matter content of 4 wt.%. The pitch in the lower layer comprised 100% mesophase of large flow patterns having a softening point of 256° C., specific gravity of 1.35 and quinolione-insoluble matter content of 41 wt.%. Yield of the nonmesophase pitch in the upper layer was 64.5 wt.% based on the material charged and yield of the 100% mesophase pitch in the lower layer was 35 wt.%. (The lower layer pitch was used in Example 6).

COMPARATIVE EXAMPLE 1

For comparison, 1.000 g of the same starting tar as in Example 1 was heat-treated at 430° C. in the same device as in Example 1 for 3 hours under nitrogen gas stream at atmospheric pressure with stirring to obtain 8.8 wt.%, based on the starting tar, of 100% mesophase pitch by only the heat treatment. The pitch was observed by means of a polarized light microscope to reveal that it comprised large flow pattern portions and small flow pattern portions and had a softening point of 325° C., specific gravity of 1.37 and quinoline-insoluble matter content of 62 wt.%. This product was also used in Example 6 for comparison.

EXAMPLE 2

1,000 g of the same starting material as in Example 1 was charged in a heat treatment device and heat-treated at 440° C. for one hour with stirring under nitrogen gas stream to obtain 22 wt.% based on the starting material, of a pitch having a softening point of 220° C., specific gravity of 1.33 and quinoline-insoluble matter content of 14 wt.%. which was observed by means of a polarized light microscope to reveal that it contained about 60% of the mesophase spheres of a diameter of up to 200μ in the mother phase. The pitch was charged in a cylindrical reactor having an inner diameter of 4 cm and a length of 70 cm and provided with a drawing cock at a lower part thereof. The pitch was allowed to stand at 380° C. with slow stirring at 30 rpm for 2 hours. Then, the cock at the lower part of the reactor was opened under an elevated nitrogen pressure of 100 mmHg and 29.5 wt.%, based on the starting material charged, of the viscous lower layer pitch was drawn slowly. Then, the drawing was continued until the viscosity of the pitch was remarkably reduced to obtain a boundary pitch between the two layers. Finally, the upper layer pitch (63 wt.%) was drawn off.

The upper layer comprised non-mesophase pitch containing about 25% of the mesophase spheres having diameters of up to 20μ. The upper layer pitch had a softening point of 176° C., specific gravity of 1.31, quinoline-insoluble matter content of 4 wt.%, carbon content of 93.4 wt.% and hydrogen content of 4.9 wt.%. The boundary pitch was the heterogeneous pitch in which the non-mesophase containing the mesophase globules of diameters of up to 100μ in the mother layer and the bulky mesophase were intermixed to form a complicated structure. The lower layer pitch comprised 100% mesophase having large flow patterns, a softening point of 260° C., specific gravity of 1.35, quinoline-insoluble matter content of 43 wt.%, carbon content of 94.1 wt.% and hydrogen content of 4.6 wt.%.

The lower layer pitch was mixed with the boundary layer pitch to obtain a mixture having a softening point of 257° C. and mesophase content of about 95%. The mixture was used in Example 6.

EXAMPLE 3

A tarry substance obtained by cracking coal into liquid was distilled under reduced pressure until a temperature of 400° C. (calculated under atmospheric pressure) was attained. The distillation residue was used as the starting material. The starting material had a carbon content of 91.6 wt.%, hydrogen content of 6.7 wt.%, specific gravity of 1.13 and quinoline-insoluble matter content of 0 wt.%. The starting material was heat-treated at 440° C. for 2 hours in the same manner as in Example 1 and the resulted pitch was observed by means of a polarized light microscope to reveal that it contained about 40% of mesophase spheres of diameters of up to 200μ which were perfectly spherical, and it had a softening point of 187° C., specific gravity of 1.32 and a quinoline-insoluble matter content of 11 wt.% with a yield of 32 wt.% based on the residual oil used as the starting material. The pitch was allowed to stand at 380° C. for 0.5 hours in the same manner as in Example 1 and then observed by means of a polarized light microscope to reveal that the upper layer comprised a non-mesophase containing about 20% of perfectly spherical mesophase spheres having a diameter of up to 20μ and having a softening point of 176° C., specific gravity of 1.29 and quinoline-insoluble matter content of 3 wt.%. The lower layer comprised 100% mesophase pitch of a large flow structure having a softening point of 265° C. specific gravity of 1.36 and quinoline-insoluble matter content of 48 wt.%.

Yield of the non-mesophase pitch in the upper layer was about 70%. Yield of the 100% mesophase pitch in the lower layer was about 30%.

EXAMPLE 4

A pitch produced in the same manner of heat-treatment as in Example 1 was charged in small aluminum vessels and alowed to stand at various temperatures in the range of from 350° C. to 400° C. and during various hours under nitrogen atmosphere. The pitches were polished in the perpendicular direction as they were kept in the vessels. The cross sections thereof were observed by means of a polarized light microscope. Then, softening points of the upper and lower layers were measured to obtain the results shown in Table 2.

TABLE 2

AGING/SETTLING CONDITIONS AND PROPERTIES OF THE RESULTING MESOPHASE PITCH

| Aging/ Settling Conditions | | Properties of Upper Layer Pitch | | Properties of Lower Layer Pitch | | |
|---|---|---|---|---|---|---|
| Temp (°C.) | Time (Hr) | Softening Pt (°C.) | Mesophase Content (Vol %) | Yield (Vol %) | Softening Pt. (°C.) | Mesophase Content (Vol %) |
| 400 | 2 | 206 | 50 | 25 | 281 | 100 |
| 390 | 2 | 206 | 50 | 32 | 275 | 100 |
| 380 | 4 | 201 | 50 | 35 | 269 | 100 |
| 380 | 2 | 199 | 20 | 32 | 263 | 100 |
| 380 | 0.75 | 195 | 20 | 30 | 258 | 98 |
| 380 | 0.5 | 192 | 25 | 32 | 259 | 100 |
| 380 | 0.25 | 195 | 25 | 28 | 260 | 99 |
| 380 | 0.1 | 192 | 20 | 30 | 251 | 99 |
| 370 | 2 | 196 | 10 | 32 | 264 | 97 |
| 360 | 2 | 194 | 15 | 35 | 247 | 95 |
| 350 | 2 | | No Clear Separation into Two Phase | | | |
| 340 | 2 | | | | | |

EXAMPLE 5

Only the upper layer pitch separated out in Example 2 was charged in a small aluminum vessel and allowed to stand at 380° C. for 2 hours under nitrogen atmosphere. The pitch was then examined in the same manner as in Example 4 to reveal that it was clearly divided into an upper layer and a lower layer and that the upper layer pitch comprised of non-mesophase as mother phase and about 10% of mesophase spheres, and it had a softening point of 175° C. and the lower layer comprised 100% mesophase pitch having a softening point of 252° C. The yield was about 15%.

EXAMPLE 6

The substantially homogeneous mesophase pitches obtained in Examples 1–3 were spun under a nitrogen atmosphere of up to 200 mmHg by means of a spinning machine having a nozzle of a diameter of 0.5 mm. The pitch fibers were treated at 240° C. for 30 minutes under oxygen atmosphere to make them infusible. Then, they were heated to 1,500° C. at a rate of 30° C./min. in an inert gas and then allowed to cool to obtain carbon

TABLE 3

PITCH PRODUCTION CONDITIONS YIELD AND PROPERTIES OF PITCH

| | | Thermal Cracking Polycondensation Step | | | | | Aging/Settling Step | | | | | | |
|---|---|---|---|---|---|---|---|---|---|---|---|---|---|
| | | | | Pitch Product | | | | | Upper Layer Pitch | | Lower Layer Pitch | | |
| | | Conditions | | | | | Conditions | | | | | | |
| No | Starting Material | Temp (°C.) | Time (Hr) | Yield (wt %) | Softening Pt (°C.) | Meso-phase Content (Vol %) | Temp (°C.) | Time (Hr) | Softening Pt (°C.) | Mesophase Content (Vol %) | Yield (Wt %) | Softening Pt. (°C.) | Meso-phase Content (Vol. %) |
| 1 | Tar obtained by Catalytic Cracking of Petroleum | 380 | 24 | 16.2 | 204 | 55 | 380 | 2 | 190 | 20 | 32 | 265 | 100 |
| 2 | Tar obtained by Catalytic Cracking of Petroleum | 415 | 3 | 14.6 | 219 | 72 | 380 | 2 | 210 | 40 | 46 | 271 | 100 |
| 3 | Tar obtained by Catalytic Cracking of Petroleum | 430 | 1 | 26.0 | 139 | 10 | 380 | 2 | 142 | 10 | 8 | 256 | 100 |
| 4 | Tar obtained by Catalytic Cracking of Petroleum | 430 | 2 | 20.0 | 197 | 50 | 380 | 0.5 | 172 | 25 | 29 | 258 | 98 |
| 5 | Tar obtained by Catalytic Cracking of Petroleum | 430 | 3 | 14.0 | 305 | 85 | 380 | 2 | | Not Separated Out | | | |
| 6 | Tar obtained by Catalytic Cracking of Petroleum | 430 | 4 | 8.7 | 325 | 98 | — | — | — | — | — | — | — |
| 7 | Tar obtained by Catalytic Cracking of Petroleum | 440 | 1 | 21.0 | 220 | 60 | 380 | 1 | 181 | 20 | 33 | 263 | 100 |
| 8 | Tar obtained by Catalytic Cracking of | 460 | 0.3 | 17.8 | 187 | 31 | 380 | 2 | 176 | 10 | 15 | 262 | 100 |

TABLE 3-continued

| | | PITCH PRODUCTION CONDITIONS YIELD AND PROPERTIES OF PITCH | | | | | | | | | | | |
|---|---|---|---|---|---|---|---|---|---|---|---|---|---|
| | | Thermal Cracking Polycondensation Step | | | | | Aging/Settling Step | | | | | | |
| | | | | Pitch Product | | | | | Upper Layer Pitch | | Lower Layer Pitch | | |
| | | Conditions | | | Softening | Meso-phase | Conditions | | Softening | Mesophase | | Softening | Meso-phase |
| No | Starting Material | Temp (°C.) | Time (Hr) | Yield (wt %) | Pt (°C.) | Content (Vol %) | Temp (°C.) | Time (Hr) | Pt (°C.) | Content (Vol %) | Yield (Wt %) | Pt. (°C.) | Content (Vol. %) |
| 9 | Petroleum Tar obtained by Catalytic Cracking of Petroleum | 470 | 0.3 | 9.2 | 315 | 90 | 380 | 2 | | Not Separated Out | | | |
| 10 | Tar obtained by Cracking Coal | 415 | 4 | 22.5 | 242 | 50 | 380 | 2 | 220 | 30 | 35 | 272 | 100 |
| 11 | Tar obtained by Cracking Coal | 430 | 5 | 15.5 | 338 | 99 | — | — | — | — | — | — | — |
| 12 | Tar obtained by Steam Cracking of Naphtha | 415 | 2 | 31.4 | 304 | 5 | 380 | 2 | | Not Separated Out | | | |

fibers. Thus, spun and derived carbon fibers were examined to obtain the results shown in Table 1.

From the mesophase pitches obtained by the process of the present invention, through good spinnability properties, with only a negligible denaturation of the pitch in the course of the spinning, carbon fibers of a tensile strength of $2\text{–}4\times10^9$ Pa. and tensile modulus of elasticity of $2\text{–}3.5\times10^{11}$ Pa. were obtained.

The pitch produced for the comparison with that obtained in Example 1 had a high spinning temperature of at least 390° C. It could not be spun at a rate of 500 m/min. At a rate of even 300 m/min., the breakage frequency of the fiber was high and the resulting carbon fiber had an insufficient strength.

EXAMPLE 7

The same tar as used in Example 1 and a tar obtained by the reduced pressure distillation of a heavy oil obtained by the steam cracking of naphtha to a temperature of 450° C. (calculated as under atmospheric pressure) were thermally cracked and polycondensed under various conditions with the same reactor as Example 1. The resulting pitches were subjected to the aging/settling/separation treatment at 380° C. in the small vessel as in Example 1 to obtain the results shown in Table 3.

What is claimed is:

1. A process for producing a mesophase pitch having a mesophase content of above 90% and a softening point of below 320° C. comprising the steps of:

(1) heat-treating a pitch forming material at elevated temperatures above about 380° C. for a time sufficient to provide a mixture of mesophase and non-mesophase pitch containing about 20% to about 80% [by weight] of mesophase and a softening point of no greater than 250° C.;

(2) aging and settling said mesophase portion of said mixture of mesophase and non-mesophase pitch obtained in step (1) by maintaining the mixture in a substantially quiescent condition and at a temperature below the temperature in the heat-treating step, *at which temperature the mixture is sufficiently liquid so that the separation of the mesophase and non-mesophase portions of the mixture can be substantially accomplished,* [and above about 350° C.] for a time sufficient for the mesophase portion of the mixture to coalesce and accumulate into a substantially lower homogeneous mesophase pitch layer containing at least 90% mesophase and an upper layer comprising the non-mesophase portion of said mixture; and (3) separating said lower mesophase layer from said upper non-mesophase layer whereby a mesophase pitch which has a mesophase content of above 90% and a softening point below 320° C. is obtained. heat-treated at a temperature in the range of about 380° C. to about 460° C. whereby thermal cracking and polycondensation reactions occur.

2. The process for producing a mesophase pitch according to claim 1 wherein the pitch forming material comprises hydrocarbons of a boiling point of at least about 400° C. as main components.

3. The process for producing a mesophase pitch according to claim 1 wherein the pitch forming material is 4. The process for producing a mesophase pitch according to claim 1 wherein the pitch forming material is heat-treated at a temperature in the range of about 400° C. to about 440° C. whereby thermal cracking and polycondensing reactions occur.

5. The process for producing a mesophase pitch according to claim 1 wherein the mesophase portion of the mixture settles at a temperature in the range of from about 350° C. to about 400° C. to accumulate the mesophase portion of a higher density as a lower layer while it grows and ages.

6. The process for producing a mesophase pitch according to claim 1 wherein the mixture is kept at a temperature in the range of from about 360° C. to about 390° C. to effect the aging and settling of mesophase.

7. The process of claim 1 wherein the mesophase of the lower layer is from 90 to 100% mesophase having a softening point of less than about 320° C.

8. The process for producing a mesophase pitch according to claim 1 wherein the pitch forming material is heat-treated for a time sufficient to produce from about 40% to about 70% mesophase based on the mixture.

9. The process for producing a mesophase pitch according to claim 1 wherein the upper layer principally comprising non-mesophase pitch portion is recycled to the heat-treating step whereby thermal and cracking-/polycondensation reactions occur.

* * * * *